United States Patent
Hofman

(10) Patent No.: US 11,698,147 B2
(45) Date of Patent: Jul. 11, 2023

(54) VALVE PACKING HAVING INDEPENDENTLY LOADED PACKING RINGS

(71) Applicant: Fisher Controls International LLC, Marshalltown, IA (US)

(72) Inventor: Brett Allen Hofman, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 0 days.

(21) Appl. No.: 17/153,318

(22) Filed: Jan. 20, 2021

(65) Prior Publication Data

US 2022/0228675 A1 Jul. 21, 2022

(51) Int. Cl.
*F16K 41/04* (2006.01)
*F16J 15/18* (2006.01)

(52) U.S. Cl.
CPC ........... *F16K 41/043* (2013.01); *F16J 15/186* (2013.01)

(58) Field of Classification Search
CPC ...... F16K 41/043; F16K 41/02; F16K 41/046; F16K 41/04; F16K 41/023; F16K 41/026; F16K 3/0236; F16K 3/0227; Y10T 137/6069; Y10T 137/6021; Y10T 137/0486; F16J 15/184; F16J 15/185; F16J 15/187; F16J 15/188; F16J 15/186
See application file for complete search history.

(56) References Cited

U.S. PATENT DOCUMENTS

| | | | | |
|---|---|---|---|---|
| 206,139 A * | 7/1878 | Ross | ..................... | F16J 15/187 277/504 |
| 1,582,786 A * | 4/1926 | Rhodes | ................... | F16K 41/02 277/525 |
| 2,069,443 A * | 2/1937 | Hill | ........................ | F16J 15/187 277/329 |
| 5,263,682 A * | 11/1993 | Covert | .................. | F16K 41/046 137/312 |
| 5,476,117 A * | 12/1995 | Pakula | ................. | F16K 41/026 137/312 |
| 2001/0020771 A1* | 9/2001 | Nishikawa | ............. | F16J 15/008 277/511 |

* cited by examiner

*Primary Examiner* — Craig J Price
*Assistant Examiner* — Andrew J Rost
(74) *Attorney, Agent, or Firm* — Hanley, Flight & Zimmerman, LLC

(57) ABSTRACT

A valve packing having independently loaded packing rings is disclosed. A packing assembly for a fluid valve includes a first packing ring, a first follower to be disposed at least partially within a bore of a bonnet of the fluid valve to apply a first load to the first packing ring, a second packing ring sized to fit within a bore of the first follower, and a second follower to be disposed at least partially within the bore of the first follower to apply a second load to the second packing ring within the bore of the first follower.

20 Claims, 4 Drawing Sheets

VALVE PACKING HAVING INDEPENDENTLY LOADED PACKING RINGS

FIELD OF THE DISCLOSURE

This disclosure relates generally to valve packing and, more particularly, to valve packings having independently loaded packing rings.

BACKGROUND

Industrial process plants (e.g., refineries, chemical plants, petrochemical plants, pharmaceutical plants, etc.) include process control loops to control temperatures, the flow of fluids, etc. Industrial control systems typically include control loops to automatically adjust the values of process variables to equal a desired set-point. Some industrial control systems include control valves to manipulate a flowing fluid, such as gas, steam, water, or chemical compounds to compensate for load disturbances and maintain the regulated process variables as close as possible to the desired set points. Control valves typically include at least one packing to maintain a seal around a stem or shaft to prevent leakage of process fluid into the environment.

SUMMARY

An example packing assembly for a fluid valve includes a first packing ring and a first follower to be disposed at least partially within a bore of a bonnet of the fluid valve to apply a first load to the first packing ring. The example apparatus further includes a second packing ring sized to fit within a bore of the first follower, and a second follower to be disposed at least partially within the bore of the first follower to apply a second load to the second packing ring within the bore of the first follower.

An example apparatus to seal a valve includes a first packing ring disposed in a valve bonnet and coupled to a first surface of a first spring disposed in the valve bonnet, and a first follower coupled to a second surface of the first spring, the second surface of the first spring opposite of the first surface of the first spring, the first follower coupled to a flange of the valve bonnet. The example apparatus also includes a second packing ring disposed on a surface of the first follower, the surface of the first follower spaced apart from the first spring, the second packing ring coupled to a first surface of a second spring. The example apparatus further includes a second follower coupled to a second surface of the second spring, the second surface of the second spring opposite of the first surface of the second spring, the second follower coupled to at least one of the first follower and the flange.

An example apparatus to seal a valve includes a first packing ring disposed in a valve bonnet to prevent first leakage from the valve in response to a first load. The example apparatus further includes a second packing ring disposed in the valve bonnet to prevent second leakage from the valve in response to a second load, the second packing ring having a different diameter from the first packing ring, and the first load substantially independent from the second load.

Figure 1:
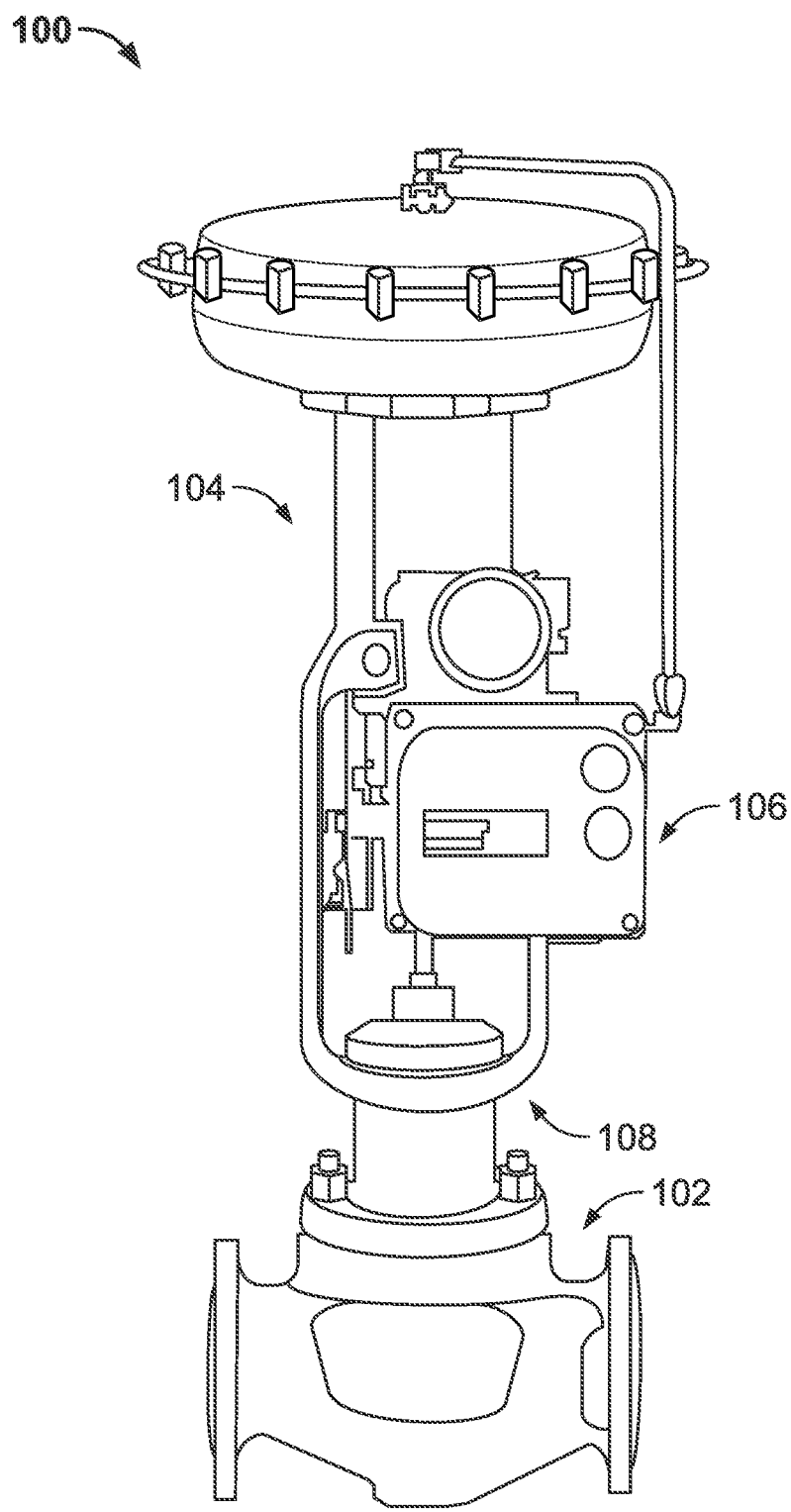
FIG. 1 is an illustration of an example control valve in accordance with the teachings of this disclosure.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

DETAILED DESCRIPTION

Industrial process plants (e.g., refineries, chemical plants, petrochemical plants, pharmaceutical plants, etc.) include process control loops to control temperatures, the flow of fluids, etc. In some examples, industrial control systems include control valves to manipulate a flowing fluid, such as gas, steam, water, or chemical compounds to compensate for load disturbances and maintain the regulated process variables as close as possible to desired set points. Control valves typically include packings to help maintain a seal within the valve to reduce leakage of the flowing fluid during operation. Minimizing the leakage via the packing helps to maintain environmental safety regulations and reduce loss of product for the industrial process plant.

Environmental standards for control valves continue to urge or require the improvement of packing designs in control valves to further reduce leakage. However, there are challenges related to designing packing systems. For example, increasing the stress (load) on the packing can generally reduce leakage. However, increasing the stress can also cause an increase in friction and wear of the packing, which results in an overall reduction in the operational life of the packing. Adding packing rings in the control valve, such as a duplex packing, can be effective in reducing leakage. However, the effectiveness of such packings is limited by the response of the packing rings to an applied load. In the case of multiple packing rings (e.g., duplex packings), an increase in stress does not result in a uniform increase in radial load throughout the packing. Instead, the radial load is typically highest in a single area of the packing. Therefore, simply adding packing rings in a control valve provides diminishing returns for reducing leakage.

Examples disclosed herein include a packing that has two or more packing rings that are independently loaded. In examples disclosed herein, two or more packing followers are nested inside each other and are loaded independently through the use of different springs and packing fasteners. In examples disclosed herein, a first packing ring and a first spring are inserted into a bonnet of a control valve followed by a first follower. In examples disclosed herein, the first follower is tightened until flush with the bonnet flange. In examples disclosed herein, a second packing ring and a second spring are inserted into the bonnet after the first follower. In examples disclosed herein, a second follower is inserted into the bonnet and fastened to either to the first follower or the bonnet flange.

In examples disclosed herein, the first follower applies a load to the first spring and the first packing ring. In examples disclosed herein, the load applied by the second follower is applied to the second spring and the second packing ring and supported by the first follower so that the load on the first packing ring does not increase upon installation of the second follower. In examples disclosed herein, the first spring and the second spring provide live loading to the first packing ring and the second packing ring, respectively.

In examples disclosed herein, the load applied to the first packing ring and the second packing ring are selected so that total load is balanced between the two packing rings, rather than one packing ring carrying a much higher load than the other as would be the case if they were not loaded independently. Examples disclosed herein result in a longer life for the packing system along with better sealing capability in the control valve.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 1 is an illustration of an example control valve 100 in accordance with the teachings of this disclosure. The example control valve 100 includes an example valve body 102, an example valve actuator 104, an example valve controller 106, and an example packing system 108. In the illustrated example of FIG. 1, the valve body 102 includes the flow control member for the control valve 100. In the illustrated example, the flow control member is a plug that is adjusted to allow a fluid to flow through the valve body 102 or to stop a fluid from flowing through the valve body 102. However, in other examples, the control valve 100 may include any other flow control member such as a globe, a ball, a butterfly, etc.

The example packing system 108 of FIG. 1 maintains a seal within the control valve 100 to reduce leakage of the process fluid in the valve body 102 during operation. In the illustrated example, the packing system 108 provides a seal around the stem of the valve actuator 104. In some examples, the packing system 108 surrounds the outer surface of the stem to prevent any leakage of the fluid from the valve body 102. An example packing system that may be included in the control valve 100 is described in further detail below in connection with FIG. 3.

In the illustrated example of FIG. 1, the control valve 100 illustrates an example of a control valve that may be used in accordance with the teachings of this disclosure. However, other valve types may additionally and/or alternatively be used in accordance with the teachings of this disclosure. For example, other control valves such as gate valves, butterfly valves, ball valves, etc. may include packing systems in accordance with the teachings of this disclosure.

Figure 2:
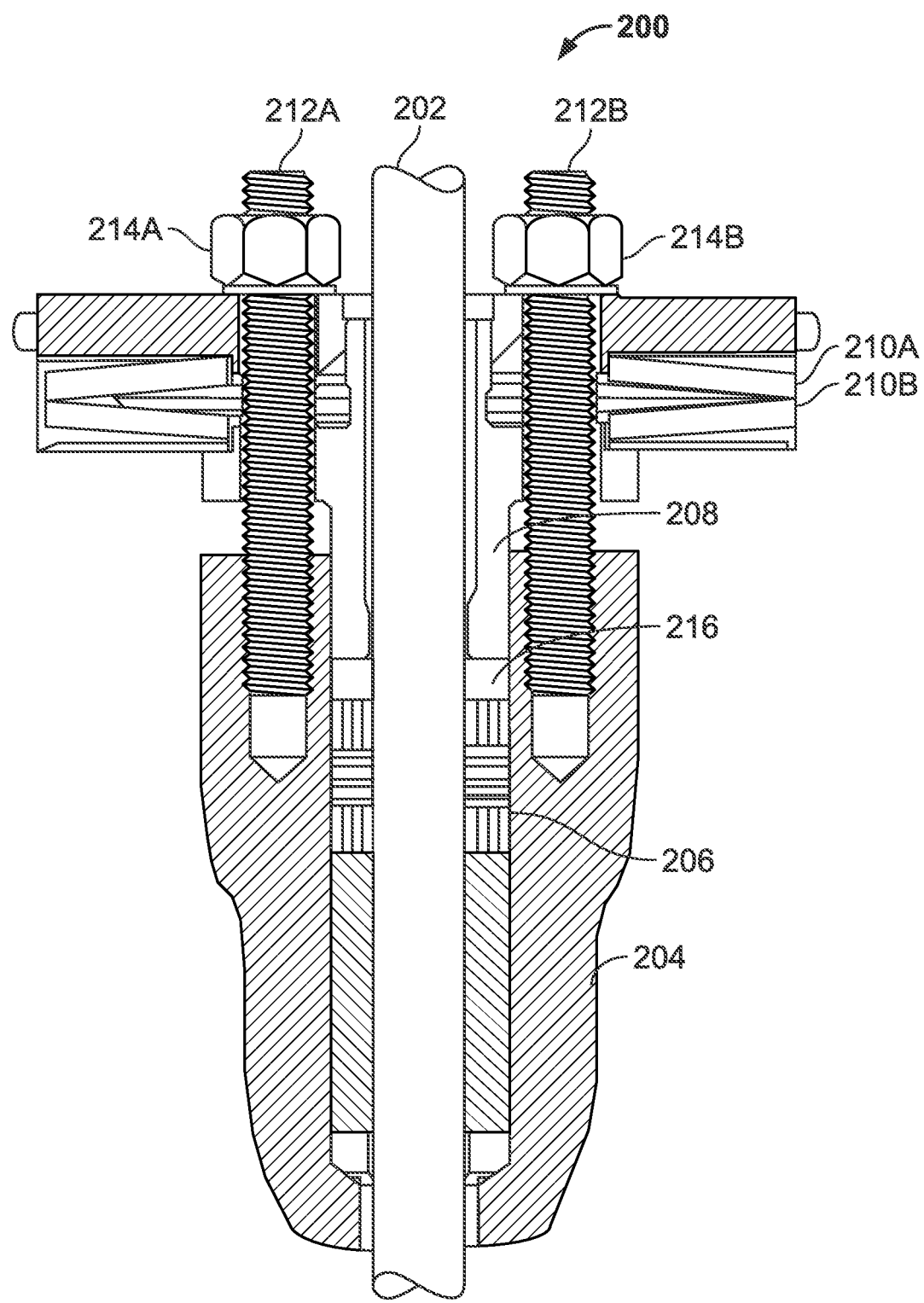
FIG. 2 illustrates a cross-sectional view of an example prior packing for a control valve.

FIG. 2 illustrates a cross-sectional view of an example known packing system 200 for a control valve. The known packing system 200 of FIG. 2 includes a stem 202, a bonnet 204, a packing assembly 206, a follower 208, springs 210A, 210B, studs 212A, 212B, nuts 214A, 214B, and a packing washer 216.

In FIG. 2, the insertion of the stem 202 though the bonnet 204 provides a potential path for fluid to leak from the valve body between the surfaces of the stem 202 and the bonnet 204. The packing assembly 206 is engaged between the stem 202 and an internal bore of the bonnet 204 to provide a seal against fluid leakage. In FIG. 2, the packing assembly 206 expands in response to a load, and the expansion of the packing assembly 206 between the stem 202 and the internal bore of the bonnet 204 provides the seal to reduce fluid leaking from the bonnet 204. In the illustrated example, the packing assembly 206 includes multiple packing rings. In some examples, the packing assembly 206 can include one packing ring, three packing rings, five packing rings, etc. The packing assembly 206 can include packing ring(s) that include graphite material, polytetrafluoroethylene (PFTE) material, etc.

The packing washer 216 is coupled between the packing assembly 206 and the follower 208. The follower 208 is coupled to the packing washer 216 to apply a load to the packing assembly 206 to expand the material of the packing assembly 206 between the stem 202 and the internal bore of the bonnet 204. The follower 208 compresses the packing assembly 206 along a longitudinal axis of the packing assembly 206 to cause the radial expansion of the material of the packing assembly 206. In FIG. 2, the springs 210A, 210B provide the dynamic load to the follower 208. The stiffness of the springs 210A, 210B determines the amount of load applied to the follower 208. The springs 210A, 210B are coupled to the follower 208 to evenly distribute the load across the follower 208. In FIG. 2, the studs 212A, 212B and the nuts 214A, 214B generate the load applied by the springs 210A, 210B. The studs 212A, 212B and the nuts 214A, 214B compress the springs 210A, 210B to generate the load applied to the follower 208 and the packing assembly 206. Specifically, the tightening torque applied to the nuts 214A, 214B determines the load generated by the springs 210A, 210B. For example, an increase in the tightening torque applied to the nuts 214A, 214B increases the compression of the springs 210A, 210B, which increases the load applied to the follower 208. The tightening torque applied to the nuts 214A, 214B can be adjusted to increase or decrease the load applied to the packing assembly 206 depending on the sealing needs for the valve.

Although the known packing system 200 of FIG. 2 provides a seal against the fluids of a valve, the performance of the known packing system 200 may not provide a sufficiently tight seal between the stem 202 and the bonnet 204. The known packing system 200 includes only one load that is applied to the packing assembly 206. In some applications, the packing assembly 206 does not prevent all leakage from the valve. For example, some fluid may leak between the packing assembly 206 and the stem 202 as well as between the packing assembly 206 and the bonnet 204. In FIG. 2, to create a tighter seal, the load applied to the packing assembly 206 must be increased. However, increasing the load on the packing assembly 206 also increases the friction and wear on the packing assembly 206, which decreases the lifespan of the packing assembly 206. In some examples where the packing assembly 206 includes multiple packing rings, increasing the load on the packing assembly 206 does not distribute the load evenly throughout the packing rings. In such examples, increasing the load on the packing assembly 206 increases the friction and wear unevenly between the packing rings of the packing assembly 206, which decreases the lifespan of the packing assembly 206. In FIG. 2, the known packing system 200 includes design constraints by only including one follower (e.g., the follower 208) and packing assembly (e.g., the packing assembly 206) to distribute load in the known packing system 200. The known packing system 200 requires a tradeoff between increasing the load on the packing assembly 206 (and, thus, friction) for a tighter seal and more frequent replacement of the packing assembly 206, or decreasing the load to improve the lifespan of the packing assembly 206 but increase the leakage through the packing assembly 206.

Figure 3:
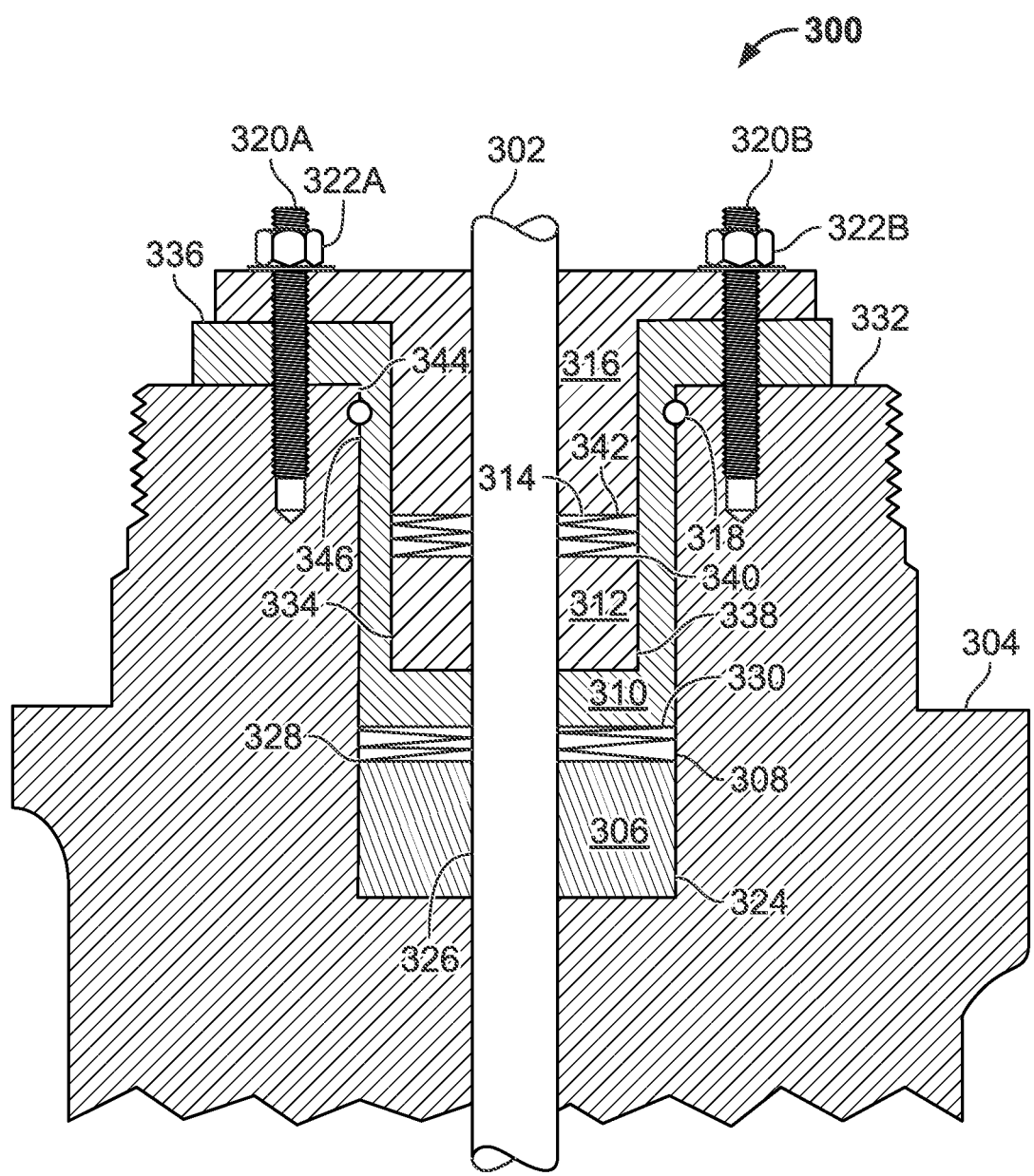
FIG. 3 illustrates a cross-sectional view of an example packing in accordance with the teachings of this disclosure.

FIG. 3 illustrates a cross-sectional view of an example packing system 300 in accordance with the teachings of this disclosure. In some examples, the packing system 300 may be implemented as the packing system 108 of FIG. 1. The example packing system 300 includes an example stem 302, an example bonnet 304, an example first packing ring 306, an example first spring 308, an example outer follower 310, an example second packing ring 312, an example second spring 314, an example inner follower 316, an example static seal 318, example studs 320A, 320B, and example nuts 322A, 322B.

The first packing ring 306 is disposed in a bore 324 within the bonnet 304. The first packing ring 306 is coupled to a first surface 326 (e.g., an outer surface) of the stem 302 and the bore 324 of the bonnet 304 to provide a seal against fluid leakage. In the illustrated example of FIG. 3, the first packing ring 306 expands in response to a load applied thereto, and the expansion of the first packing ring 306 between the stem 302 and the bore 324 of the bonnet 304 provides a seal to reduce fluid leaking from the valve body. In some examples, the first packing ring 306 can include graphite material, PFTE material, etc. In some examples, the first packing ring 306 can be a packing assembly that includes multiple packing rings. For example, the first packing ring 306 can include one packing ring, three packing rings, five packing rings, etc.

The first spring 308 is disposed in the bore 324 of the bonnet 304 and coupled to a second surface 328 (e.g., top surface or upper surface) of the first packing ring 306. In some examples, the first spring 308 may include one or more wave springs, Belleville springs, etc. In the illustrated example, the outer follower 310 is disposed partially in the bore 324 of the bonnet 304 and coupled to a third surface 330 (e.g., top surface or upper surface) of the first spring 308. The outer follower 310 is disposed partially outside of the bore 324 of the bonnet 304 and coupled to an outside surface 332 of the bonnet 304 (e.g., a flange of the bonnet 304). In some examples, the outer follower 310 is coupled to the bonnet 304 via the studs 320A, 320B and the nuts 322A, 322B.

The second packing ring 312 is disposed in a bore 334 of the outer follower 310 and coupled to a fourth surface 336 (e.g., top surface or upper surface) of the outer follower 310. The second packing ring 312 is sized to closely fit within the bore 334 of the outer follower 310. In the illustrated example, the second packing ring 312 has a different (e.g., smaller) diameter than the first packing ring 306 to fit within the bore 334 of the outer follower 310. The second packing ring 312 is coupled to the first surface 326 of the stem 302 and an internal surface 338 of the bore 334 of the outer follower 310 to provide a seal against fluid leakage from the first packing ring 306. In the illustrated example of FIG. 3, the second packing ring 312 expands in response to a load applied thereto, and the expansion of the second packing ring 312 between the stem 302 and the internal surface 338 of the bore 334 of the outer follower 310 provides a seal to reduce fluid leaking from between the first packing ring 306 and the stem 302. In some examples, the second packing ring 312 can include graphite material, PFTE material, etc. In some examples, the second packing ring 312 can be a packing assembly that includes multiple packing rings. For example, the second packing ring 312 can include one packing ring, three packing rings, five packing rings, etc.

The example second spring 314 is disposed in the bore 334 of the outer follower 310 and coupled to a fifth surface 340 (e.g., top surface or upper surface) of the second packing ring 312. Thus, the second spring 314 is disposed between the second packing ring 312 and the inner follower 316. In some examples, the second spring 314 may include one or more wave springs, Belleville springs, etc. In the illustrated example, the inner follower 316 is disposed partially within the bore 324 of the bonnet 304 and coupled to a sixth surface 342 (e.g., top surface or upper surface) of the second spring 314. The inner follower 316 is sized to fit within the bore 334 of the outer follower 310. The inner follower 316 is disposed partially outside of the bore 324 of the bonnet 304 and coupled to an outside surface of the bonnet 304. In the illustrated example, the inner follower 316 is coupled to the fourth surface 336 of the outer follower 310 outside of the bonnet 304. In some examples, the inner follower 316 may be coupled to a flange of the bonnet 304. In some examples, the inner follower 316 is coupled to the fourth surface 336 of the outer follower 310 or to the flange of the bonnet 304 via the studs 320A, 320B and the nuts 322A, 322B.

The static seal 318 is coupled to an outer surface 344 of the outer follower 310 and an inner surface 346 of the bonnet 304. The static seal 318 prevents or reduces any leakage from between the first packing ring 306 and the bonnet 304. In some examples, the first packing ring 306 may not completely prevent fluid leakage between the first packing ring 306 and bonnet 304. Thus, the static seal 318 provides an additional seal between the outer follower 310 and the bonnet 304 to seal against any fluid that has leaked past the first packing ring 306. In some examples, the static seal 318 includes an O-ring. However, other static seals may additionally and/or alternatively be used.

In the illustrated example of FIG. 3, the studs 320A, 320B and the nuts 322A, 322B generate the loads for the outer follower 310 and the inner follower 316. The studs 320A, 320B and the nuts 322A, 322B apply a load to the outer follower 310 and the inner follower 316. The outer follower 310 and the inner follower 316 compress the first spring 308 and the second spring 314 to transmit the loads to the first packing ring 306 and the second packing ring 312, respectively. In the illustrated example, the first spring 308 is disposed between the first packing ring 306 and the outer follower 310. The outer follower 310 applies a load to the first packing ring 306 via the first spring 308. In the illustrated example, the load from the compression of the first spring 308 radially displaces (e.g., expands) the materials of the first packing ring 306 to create a seal to prevent leakage.

In the illustrated example, the second spring 314 is disposed between the second packing ring 312 and the inner follower 316. The inner follower 316 applies a load to the second packing ring 312 via the second spring 314. In the illustrated example, the load from the compression of the second spring 314 radially displaces (e.g., expands) the materials of the second packing ring 312 to create an additional seal in the valve to prevent leakage. In some examples, the first packing ring 306 may not completely prevent leakage from the valve between the first packing ring 306 and the stem 302 (e.g., creates a leakage path between the first packing ring 306 and the stem 302). The second packing ring 312 creates an additional seal between the second packing ring 312 and the stem 302 to seal against a portion of fluid leakage that passed the first packing ring 306.

In the illustrated example, the load applied by the inner follower 316 is transmitted to the second spring 314 and the second packing ring 312 and is supported by the outer follower 310 so that the load on the first packing ring 306 is not significantly increased upon installation of the inner follower 316. The two different followers (e.g., the outer follower 310 and the inner follower 316) allow for the first packing ring 306 and the second packing ring 312 to be independently loaded from one another (e.g., have two different loads).

In some examples, the tightening torque applied to the nuts 322A, 322B determines the different values/amounts of the loads applied by the first spring 308 and the second spring 314. For example, an increase in the torque applied to the nuts 322A, 322B increases the compression force applied by the outer follower 310 and the inner follower 316 to the first spring 308 and the second spring 314, respectively, which increases the different loads applied the first packing ring 306 and the second packing ring 312, respectively. In some examples, the tightening torque applied to the nuts 322A, 322B can be adjusted to increase or decrease the different loads applied to the first packing ring 306 and the second packing ring 312 depending on the sealing needs for the valve.

In some examples, the selection of the loads on first packing ring 306 and the second packing ring 312 is such that, rather than one packing ring (or packing assembly) carrying a much higher load than the other packing ring (or packing assembly) as would be the case if they were not loaded independently, the overall load is balanced between the first packing ring 306 and the second packing ring 312. In some examples, the balance of loads between the first packing ring 306 and the second packing ring 312 results in a longer life for both the first packing ring 306 and the second packing ring 312 while still increasing the load to improve the sealing capability. In some examples, the packing system 300 of FIG. 3 can include additional packing rings (e.g., more than 2). In some examples, the packing system 300 of FIG. 3 can include additional packing assemblies (e.g., more than 2). In such examples, the packing system 300 also includes additional followers (e.g., one for each additional packing ring or packing assembly) to control the load applied to the packing rings or packing assemblies. In some examples, increasing the number of packing rings or packing assemblies may further improve the sealing capability of the packing system 300.

Figure 4:
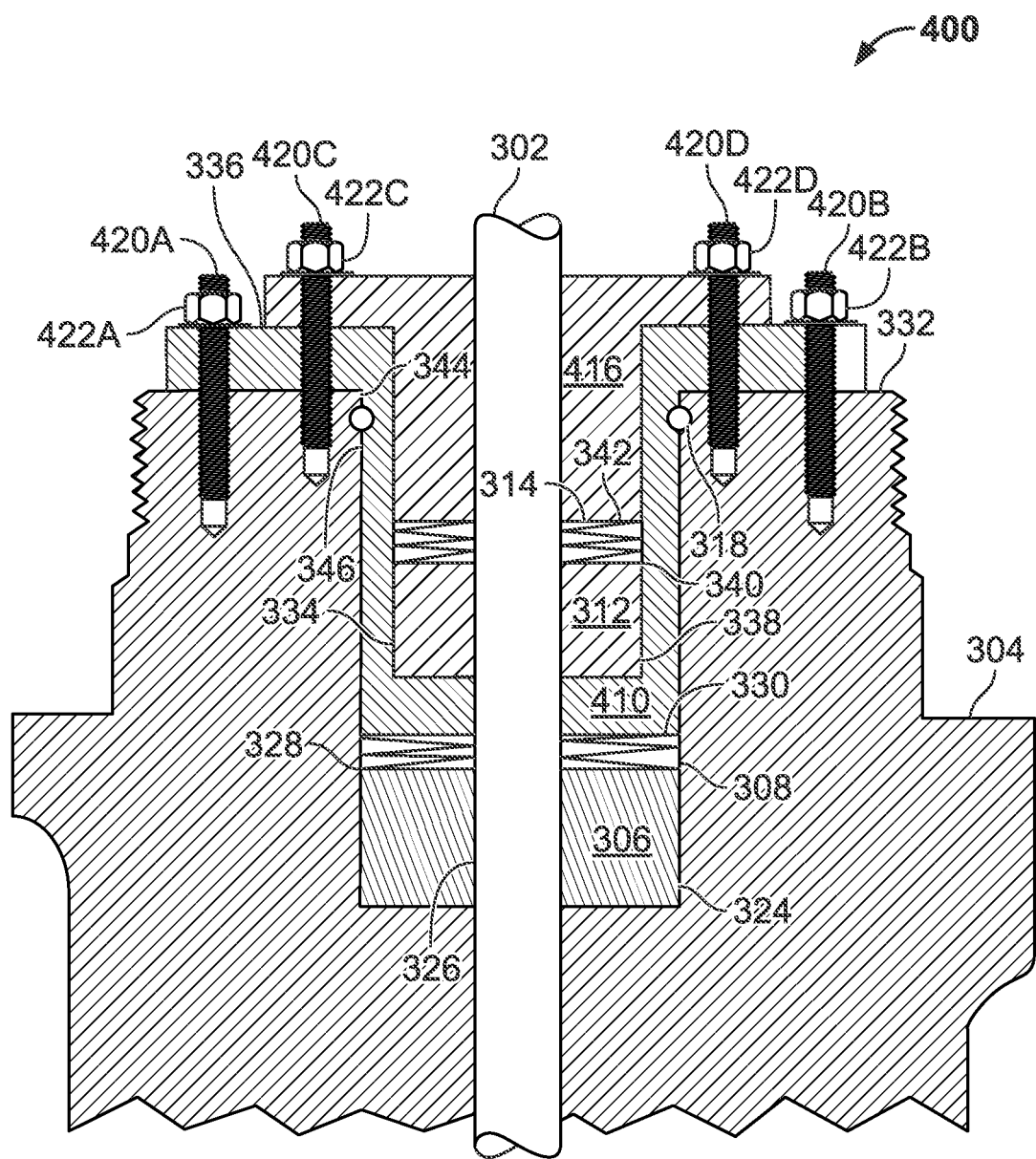
FIG. 4 illustrates a cross-sectional view of an alternative example packing in accordance with the teachings of this disclosure.

FIG. 4 illustrates a cross-sectional view of an alternative example packing system 400 in accordance with the teachings of this disclosure. In some examples, the packing system 400 may be implemented as the packing system 108 of FIG. 1. The packing system 400 includes the stem 302, the bonnet 304, the first packing ring 306, the first spring 308, an outer follower 410, the second packing ring 312, the second spring 314, an inner follower 416, and the static seal 318. The packing system 400 further includes studs 420A, 420B, 420C, 420D and nuts 422A, 422B, 422C, 422D.

In the illustrated example, the packing system 400 includes two different sets of fasteners (e.g., one set for the outer follower 410 and a different set for the inner follower 416). In such examples, the first set of fasteners (the studs 420A, 420B and the nuts 422A, 422B) apply a first load on the outer follower 410, and a second set of fasteners (the studs 420C, 420D and the nuts 422C, 422D) apply a second load on the inner follower 416. In some examples, the outer follower 410 is coupled to the flange of the bonnet 304 using the studs 420A, 420B and the nuts 422A, 422B to generate the first load, and the inner follower 416 is coupled to the fourth surface 336 of the outer follower 410 using the studs 420C, 420D and the nuts 422C, 422D to generate the second load.

From the foregoing, it will be appreciated that example methods, apparatus and articles of manufacture have been disclosed that improve a valve packing by using independently loaded packing rings. The example methods, apparatus and articles of manufacture use multiple packing rings that are loaded independently to balance the total load between the packing rings instead of one packing ring carrying a significantly higher load. The example methods, apparatus and articles of manufacture improve the sealing capability in a valve by increasing the load applied to the packing system, which creates a tighter seal. The example methods, apparatus and articles of manufacture also increase the life for the packing system by load balancing between multiple packing rings.

Example methods, apparatus, systems, and articles of manufacture for valve packings having independently loaded packing rings are disclosed herein. Further examples and combinations thereof include the following:

Example 1 includes a packing assembly for a fluid valve, the packing assembly comprising a first packing ring, a first follower to be disposed at least partially within a bore of a bonnet of the fluid valve to apply a first load to the first packing ring, a second packing ring sized to fit within a bore of the first follower, and a second follower to be disposed at least partially within the bore of the first follower to apply a second load to the second packing ring within the bore of the first follower.

Example 2 includes the packing assembly of example 1, further including a first spring to be disposed within the bore of the bonnet of the fluid valve between the first packing ring and the first follower.

Example 3 includes the packing assembly of example 2, further including a second spring sized to fit within the bore of the first follower between the second packing ring and the second follower.

Example 4 includes the packing assembly of example 3, wherein the first follower applies the first load via the first spring and the second follower applies the second load via the second spring.

Example 5 includes the packing assembly of example 1, wherein the first follower is to be disposed at least partially outside of the bore of the bonnet of the fluid valve and to be coupled to an outside surface of the bonnet.

Example 6 includes the packing assembly of example 1, wherein the second follower is to be disposed at least partially outside of the bore of the bonnet of the fluid valve and to be coupled to at least one of an outside surface of the bonnet or a surface of the first follower that is disposed at least partially outside of the bore of the bonnet.

Example 7 includes an apparatus to seal a valve, the apparatus comprising a first packing ring disposed in a valve bonnet and coupled to a first surface of a first spring disposed in the valve bonnet, a first follower coupled to a second surface of the first spring, the second surface of the first spring opposite of the first surface of the first spring, the first follower coupled to a flange of the valve bonnet, a second packing ring disposed on a surface of the first follower, the surface of the first follower spaced apart from the first spring, the second packing ring coupled to a first surface of a second spring, and a second follower coupled to a second surface of the second spring, the second surface of the second spring opposite of the first surface of the second spring, the second follower coupled to at least one of the first follower and the flange.

Example 8 includes the apparatus of example 7, wherein the first follower is coupled to the flange via first bolts, and wherein the second follower is coupled to the at least one of the first follower or the flange of the valve bonnet via second bolts.

Example 9 includes the apparatus of example 8, wherein the first bolts apply a first load on the first follower and the second bolts apply a second load on the second follower.

Example 10 includes the apparatus of example 9, wherein the first bolts apply the first load via the first spring and the second bolts apply the second load via the second spring.

Example 11 includes the apparatus of example 10, wherein the first load on the first packing ring is applied substantially independent from the second load on the second packing ring.

Example 12 includes the apparatus of example 7, wherein the first packing ring is to allow a leakage including a portion of fluid in the valve, the first packing ring to cause a first leakage path and a second leakage path for the leakage.

Example 13 includes the apparatus of example 12, wherein the second packing ring is to prevent fluid leaking from the first leakage path.

Example 14 includes the apparatus of example 12, further including a static seal coupled to an outer surface of the first follower and an inner surface of the valve bonnet to prevent fluid leaking from the second leakage path.

Example 15 includes the apparatus of example 14, wherein the static seal includes an O-ring.

Example 16 includes the apparatus of example 7, wherein the first spring and the second spring include at least one of a wave spring or a Belleville spring.

Example 17 includes an apparatus to seal a valve, the apparatus comprising a first packing ring disposed in a valve bonnet to prevent first leakage from the valve in response to a first load, and a second packing ring disposed in the valve bonnet to prevent second leakage from the valve in response to a second load, the second packing ring having a different diameter from the first packing ring, and the first load substantially independent from the second load.

Example 18 includes the apparatus of example 17, wherein the first load prevents the first leakage from the valve through the first packing ring and the second load prevents the second leakage from the valve through the second packing ring, the first load having a different value than the second load.

Example 19 includes the apparatus of example 18, wherein the first load displaces materials of the first packing ring to create a seal in the valve to prevent the first leakage.

Example 20 includes the apparatus of example 18, wherein the second load displaces materials of the second packing ring to create a seal in the valve to prevent the second leakage, the second leakage including a portion of the first leakage from the first packing ring.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A packing assembly for a fluid valve, the packing assembly comprising:
a first packing ring sized to fit within a bore of a bonnet of the fluid valve;
a first follower to be disposed at least partially within the bore of the bonnet, the first follower to apply a first load to the first packing ring, the first follower coupled to the bonnet via a first fastener external to the bonnet, wherein a first tightening torque of the first fastener determines at least a portion of the first load;
a first spring sized to fit within the bore of the bonnet between the first packing ring and the first follower;
a second packing ring sized to fit within a bore of the first follower; and
a second follower to be disposed at least partially within the bore of the first follower, the second follower to apply a second load to the second packing ring within the bore of the first follower, the second follower coupled to the first follower and the bonnet via a second fastener, wherein a tightening torque of the second fastener determines the second load and at least a portion of the first load.

2. The packing assembly of claim 1, further including a second spring sized to fit within the bore of the first follower between the second packing ring and the second follower.

3. The packing assembly of claim 2, wherein the first follower applies the first load via the first spring and the second follower applies the second load via the second spring.

4. The packing assembly of claim 1, wherein the first follower is to be disposed at least partially outside of the bore of the bonnet of the fluid valve and to be coupled to an outside surface of the bonnet.

5. The packing assembly of claim 1, wherein the second follower is to be disposed at least partially outside of the bore of the bonnet of the fluid valve and to be coupled to at least one of an outside surface of the bonnet or a surface of the first follower that is disposed at least partially outside of the bore of the bonnet.

6. An apparatus to seal a valve, the apparatus comprising:
a first packing ring disposed in a valve bonnet and coupled to a first surface of a first spring disposed in the valve bonnet;
a first follower coupled to a second surface of the first spring, the second surface of the first spring opposite of the first surface of the first spring, the first follower coupled to a flange of the valve bonnet via a first fastener, wherein a first tightening torque of the first fastener determines at least a portion of a first load;
a second packing ring disposed on a surface of the first follower, the surface of the first follower spaced apart from the first spring, the second packing ring coupled to a first surface of a second spring; and
a second follower coupled to a second surface of the second spring, the second surface of the second spring opposite of the first surface of the second spring, the second follower coupled to the first follower and the flange via a second fastener, wherein a tightening torque of the second fastener determines at least a portion of the first load for the first follower and a second load for the second follower.

7. The apparatus of claim 6, wherein the first fastener applies the first load via the first spring and the second fastener applies the second load via the second spring.

8. The apparatus of claim 7, wherein the first load on the first packing ring is different from the second load on the second packing ring.

9. The apparatus of claim 6, wherein the first packing ring is to allow a leakage including a portion of fluid in the valve, the first packing ring to cause a first leakage path and a second leakage path for the leakage.

10. The apparatus of claim 9, wherein the second packing ring is to prevent fluid leaking from the first leakage path.

11. The apparatus of claim 9, further including a static seal coupled to an outer surface of the first follower and an inner surface of the valve bonnet to prevent fluid leaking from the second leakage path.

12. The apparatus of claim 11, wherein the static seal includes an O-ring.

13. The apparatus of claim 6, wherein the first spring and the second spring include at least one of a wave spring or a Belleville spring.

14. A valve, comprising:
a bonnet including a first bore;
a first packing ring disposed within the first bore;
a first follower disposed at least partially within the first bore, the first follower including a second bore, the first follower to apply a first load to the first packing ring, the first follower coupled to the bonnet via a first fastener, wherein a first tightening torque of the first fastener determines at least a portion of the first load;
a first spring disposed within the first bore between the first packing ring and the first follower;
a second packing ring disposed within the second bore; and
a second follower disposed at least partially within the second bore, the second follower to apply a second load to the second packing ring, the second follower coupled to the first follower and the bonnet via a second fastener, wherein a tightening torque of the second fastener determines the second load and at least a portion of the first load.

15. The valve of claim 14, wherein the first spring includes at least one of a wave spring or a Belleville spring.

16. The valve of claim 14, further comprising a second spring disposed within the second bore between the second packing ring and the second follower.

17. The valve of claim 16, wherein the second spring includes at least one of a wave spring or a Belleville spring.

18. The valve of claim 16, wherein the first follower applies the first load via the first spring and the second follower applies the second load via the second spring.

19. The valve of claim 14, wherein the first follower is disposed at least partially outside of the first bore and coupled to an outside surface of the bonnet.

20. The valve of claim 19, wherein the second follower is disposed at least partially outside of the second bore and coupled to an outside surface of the first follower.

* * * * *